United States Patent
Looman, Jr. et al.

(10) Patent No.: US 6,821,106 B1
(45) Date of Patent: Nov. 23, 2004

(54) ROLLER DIE PREFORMER FOR WIDE EXTRUSIONS

(75) Inventors: Ernest Wilford Looman, Jr., Tallmadge, OH (US); Bruce Joseph Turner, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/602,127

(22) Filed: Jun. 24, 2003

(51) Int. Cl.$^7$ .......................... B29D 7/01; B29C 47/14
(52) U.S. Cl. ................. 425/224; 425/325; 425/382.3; 425/328.4
(58) Field of Search ...................... 425/325, 382.3, 425/382.4, 466, 327, 380, 381, 224

(56) References Cited

U.S. PATENT DOCUMENTS

| | | | |
|---|---|---|---|
| 2,734,224 A | | 2/1956 | Winstead .................... 18/12 |
| 3,142,091 A | * | 7/1964 | Curtiss ..................... 425/214 |
| 3,268,950 A | | 8/1966 | Rankin ........................ 18/12 |
| 3,292,211 A | | 12/1966 | Strange ....................... 18/12 |
| 3,357,150 A | | 12/1967 | Criss .......................... 18/12 |
| 3,382,537 A | | 5/1968 | Tigner ......................... 18/12 |
| 3,393,426 A | * | 7/1968 | Meienberg ................. 425/209 |
| 3,551,951 A | | 1/1971 | Schiesser ...................... 18/12 |
| 3,557,265 A | * | 1/1971 | Chrisholm et al. ......... 264/46.1 |
| 3,584,343 A | * | 6/1971 | Kohlepp et al. ............ 425/130 |
| 3,825,645 A | | 7/1974 | Fayet ........................ 264/177 |
| 3,871,810 A | * | 3/1975 | Geyer ....................... 425/374 |
| 3,956,056 A | * | 5/1976 | Boguslawski et al. ...... 156/500 |
| 4,017,240 A | | 4/1977 | Nelson .................... 425/192 R |
| 4,281,980 A | | 8/1981 | Hoagland et al. .......... 425/461 |
| 4,299,789 A | * | 11/1981 | Giesbrecht ............. 264/211.12 |
| 4,395,217 A | | 7/1983 | Benadi .................... 425/382 R |
| 4,439,125 A | | 3/1984 | Dieckmann et al. ........ 425/140 |
| 4,470,790 A | | 9/1984 | Harada et al. .......... 425/192 R |
| 4,526,528 A | * | 7/1985 | Kline et al. ............... 425/133.5 |
| 4,539,169 A | * | 9/1985 | Nixon et al. .............. 264/173.1 |
| 4,690,628 A | | 9/1987 | Dehennau et al. ........ 425/133.5 |
| 4,944,666 A | | 7/1990 | Hilke et al. ............... 425/131.1 |
| 4,963,309 A | * | 10/1990 | Gohlisch et al. ............ 264/175 |
| 4,990,293 A | | 2/1991 | Macosko et al. .......... 264/40.1 |
| 5,017,118 A | * | 5/1991 | Looman et al. .......... 425/133.5 |
| 5,147,195 A | | 9/1992 | Cloeren .................... 425/133.5 |
| 5,522,719 A | | 6/1996 | Umeda et al. .............. 425/380 |
| 5,616,350 A | | 4/1997 | Wissmann et al. ....... 425/133.1 |
| 5,928,679 A | * | 7/1999 | Ohki et al. .................. 425/327 |

FOREIGN PATENT DOCUMENTS

| | | | |
|---|---|---|---|
| DE | 3448026 A1 | 3/1986 | ......... B29C/47/12 |
| FR | 2130986 | 11/1972 | ......... B21C/25/00 |
| GB | 2016355 A | 9/1979 | ......... B29C/15/00 |
| JP | 53-121059 | 10/1978 | ............ B29F/3/04 |
| JP | 56-129137 | 10/1981 | ............ B29D/7/04 |
| JP | 57-36624 | 2/1982 | ............ B29D/7/04 |

OTHER PUBLICATIONS

Engineering & Processing News, *Coextrusion Takes a Giant Step into the Future*, Modern Plastics, Aug. 1983 (3 pages).
Yokohama Rubber Co. Ltd., *Extrusion of Rubber Sheets or Tape*, Patent No. JP66008455B, Abstract (1 page).

* cited by examiner

*Primary Examiner*—Mark Eashoo
(74) *Attorney, Agent, or Firm*—Wood, Herron & Evans, LLP

(57) ABSTRACT

A roller die preformer for use in an extrusion system to form wide extruded components, such as a rubber tire tread, on a surface of a roller. The roller die preformer includes a flow inlet, a flow outlet and a laterally expanding flow channel extending from the flow inlet to the flow outlet. A flow restrictor is configured within the flow channel to urge the flow of material toward the lateral extremities of the flow channel to thereby form an extruded component at the flow outlet having a lateral width which is greater than the lateral width of the flow inlet of the preformer.

22 Claims, 8 Drawing Sheets

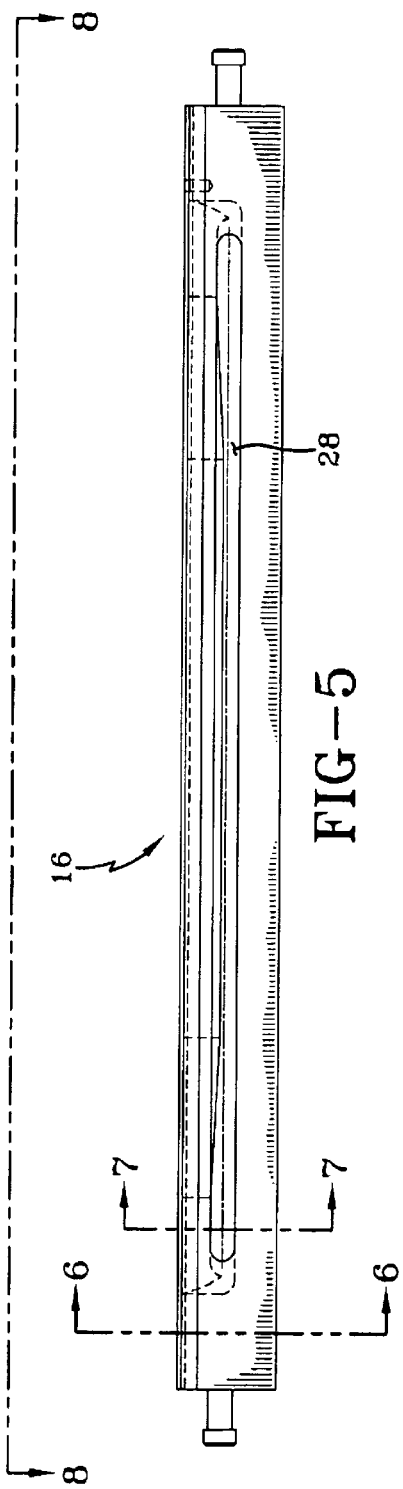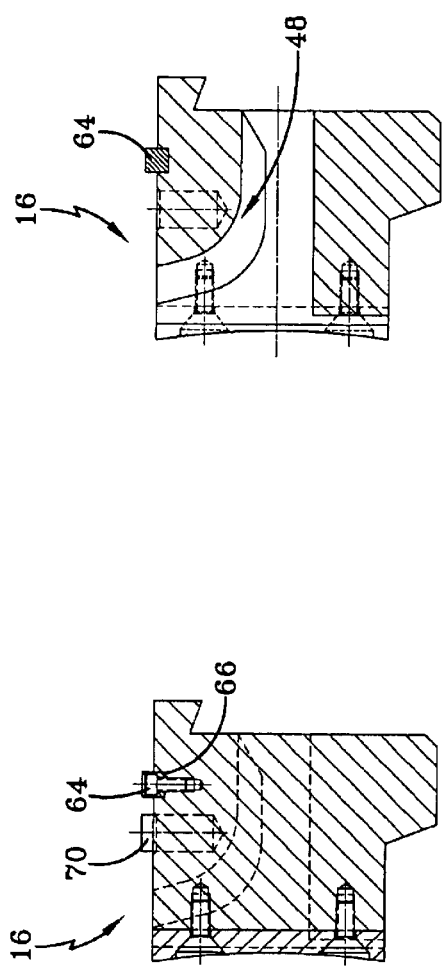

ROLLER DIE PREFORMER FOR WIDE EXTRUSIONS

FIELD OF THE INVENTION

The present invention relates generally to extrusion systems for forming strips of polymeric material and, more particularly, to a preformer for use in such systems to form wide extruded components, such as a rubber tire tread, on a surface of a roller.

BACKGROUND OF THE INVENTION

Extrusion systems are well known in the art for extruding strips of polymeric material onto a surface of a roller. The extruded component is temporarily carried by the roller and then travels downstream of the roller where it may be further processed into specific rubber tire tread lengths by way of example. Typical extrusion systems include an extruder head which conveys a flow of material through a laterally expanding flow channel to a discharge outlet of the head. Oftentimes, it is necessary to shape the extruded material from the extruder head into a more specific shape before it is extruded through a final profile die onto the surface of the roller.

To this end, roller die preformers are used to shape the flow of material in the interim area between the discharge outlet of the extruder head and the outer circumferential surface of the roller. The preformer is connected in fluid communication with the discharge outlet of the extruder head and is further positioned very close to or even in contact with the roller. The preformer includes a flow inlet configured to receive a flow of material from the discharge outlet of the extruder head and a flow outlet configured to form the extruded component on the surface of the roller.

In the past, roller die preformers have been configured with a flow inlet having a lateral width which is generally equal to the lateral width of the discharge outlet of the extruder head, and further with a flow outlet having a lateral width which is generally narrower than or as wide as the lateral width of the flow inlet. A flow channel is provided within the preformer to convey the flow of material between the flow inlet and the flow outlet so that the extruded component on the surface of the roller may have a lateral width which is narrower than or as wide as the lateral width of the flow inlet depending on the configuration of the preformer. A profile die is mounted to the preformer to profile the extruded material as it exits the flow outlet and is thereafter extruded onto the surface of the roller.

A problem occurs when it is desirable to form an extruded component having a lateral width which is wider than the lateral width of the discharge outlet of the extruder head. In the past, this has required a change to a larger extruder head having an appropriately sized discharge outlet for the desired lateral width of the extruded component. For example, if a thirty-four (34) inch wide extruded component is desired, an extruder head having a discharge outlet with the same or even a wider lateral width has been required. Of course, it will be appreciated that such a change results in a significant expense for the purchase of a wider extrusion head, significant labor and lost production costs associated with installing the wider extruder head, and lost production time as current dies must be redeveloped for the wider extruder head.

Therefore, there is a need for an extrusion system which is capable of forming a variety of extruded component widths on the surface of a roller during an extrusion process while overcoming the drawbacks and shortcomings of extrusion systems heretofore known.

SUMMARY OF THE INVENTION

The present invention overcomes the foregoing and other shortcomings and drawbacks of extrusion systems heretofore known for forming wide extruded components on the surface of a roller. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a roller die preformer is provided for use in an extrusion system to form wide extruded components, such as a rubber tire tread by way of example, on a surface of a roller. The extrusion system includes a conventional extruder head, which conveys polymeric material, including plasticized and elastomeric materials such as rubber, through a laterally expanding flow channel to a discharge outlet of the head.

The roller die preformer of the present invention is connected in fluid communication with the discharge outlet of the extruder head and is further positioned very close to or in contact with a conventional roller so as to form a wide extruded component on a surface of the roller. The preformer has an elongated flow inlet which is configured to receive a flow of material from the discharge outlet of the extruder head and has a lateral width which is generally equal to the lateral width of the discharge outlet of the extruder head. The preformer further includes a laterally expanding flow channel which extends between the flow inlet and an elongated flow outlet of the preformer which has a lateral width which is wider than the lateral width of the flow inlet. The flow channel is configured to laterally expand a flow of material as it travels from the flow inlet to the flow outlet to thereby form a wide extrusion on the surface of the roller.

In accordance with the principles of the present invention, a flow restrictor is configured within the flow channel to urge the flow of material toward the lateral extremities of the flow channel. During an extrusion process, the flow of material impinges on the flow restrictor so that lateral areas of reduced pressure are thereby created on opposite sides of the flow restrictor and toward the lateral extremities of the flow channel. These lateral areas of reduced pressure allow a greater volume of the flow of material to flow toward the lateral extremities of the flow channel and toward the flow outlet as compared to the volume of material flowing proximate the central portion of the flow channel so that a uniform flow distribution across the lateral width of the flow outlet is achieved.

In accordance with the principles of the present invention, the flow of material retains its expanded lateral width as it is extruded onto the outer surface of the roller because the elastic memory of the flow of material has been altered by the lateral expansion of the flow of material within the flow channel as influenced by the configuration of the flow restrictor. In this way, a wide extruded component is formed on the surface of the roller having a lateral width which is wider than the lateral widths of the flow inlet of the preformer and the discharge outlet of the extruder head.

An elongated die plate having an elongated profiled face is mounted to the preformer so as to partially occlude the flow outlet and thereby form a die outlet between the profiled face of the die plate and the outer surface of the roller. The profiled face of the die plate profiles the extrudate as it exits the flow outlet of the preformer and thereafter flows onto the outer surface of the roller to form the wide extruded component in accordance with the principles of the present invention.

The above and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 5 is a side elevational view of the preformer shown in FIG. 1, illustrating the flow inlet side of the preformer;

FIG. 6 is a cross-sectional view of the preformer taken along line 6—6 of FIG. 5;

FIG. 7 is a cross-sectional view of the preformer taken along line 7—7 of FIG. 5;

DETAILED DESCRIPTION OF THE PREFERRED EMBODIMENT

Figure 1:
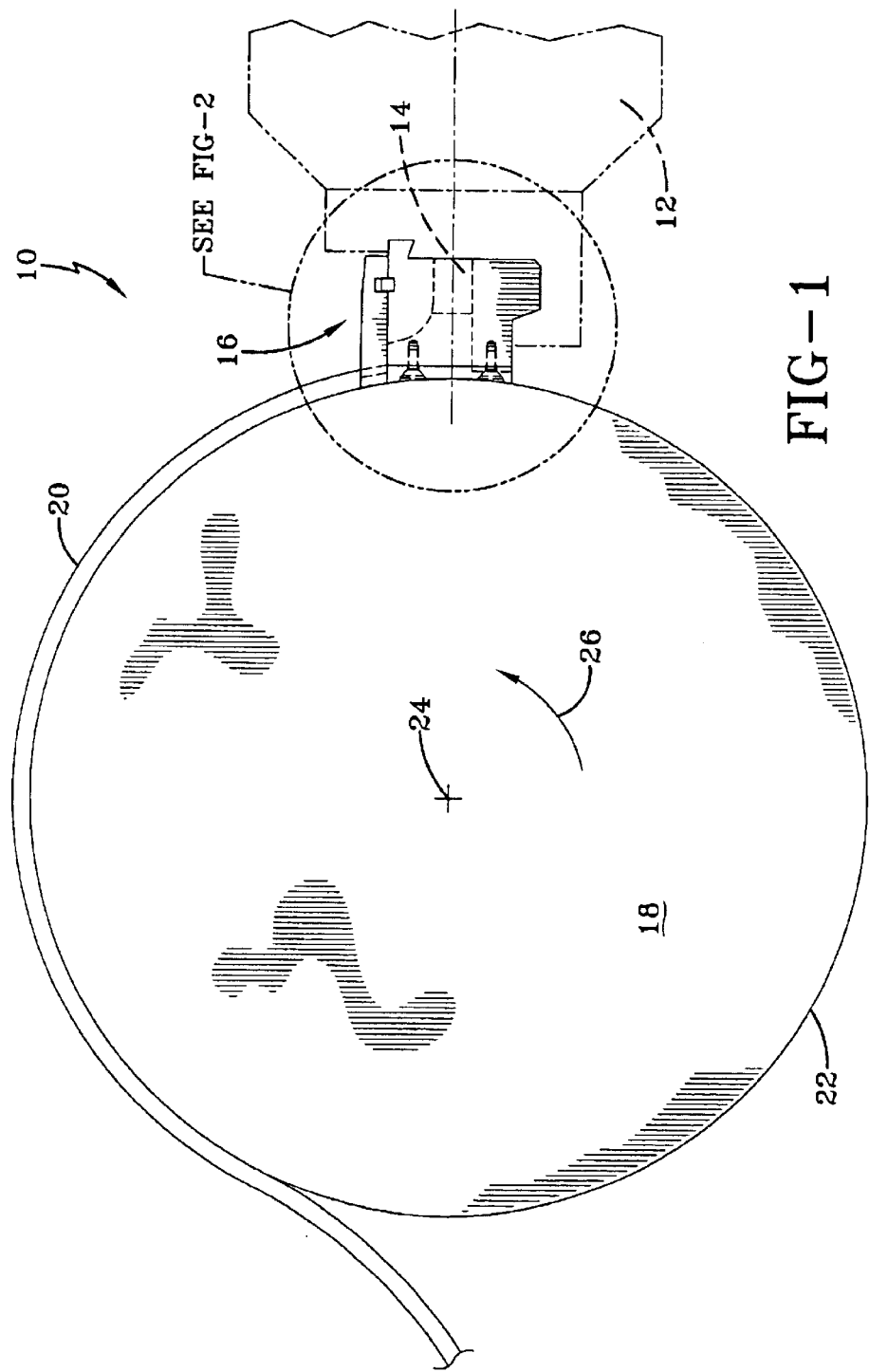
FIG. 1 is a side elevational view of an extrusion system including a roller die preformer in accordance with the principles of the present invention for forming a wide extruded component on an outer circumferential surface of a roller.

Referring now to the Figures, and to FIG. 1 in particular, an extrusion system 10 is shown in accordance with the principles of the present invention. Extrusion system 10 includes a conventional extruder head 12 well known to those of ordinary skill in the art which conveys polymeric material, including plasticized and elastomeric materials such as rubber, through a laterally expanding flow channel (not shown) within the extruder head 12 between a flow inlet (not shown) and a discharge outlet 14 of the extruder head 12. In accordance with the principles of the present invention, a roller die preformer 16 is connected in fluid communication with the extruder head 12 and is further positioned very close to or in contact with a conventional roller 18 so as to form a wide extruded component 20 on an outer circumferential surface 22 of the roller 18 as will be described in greater detail below. The extruded component 20 is temporarily carried by the roller 18 as the roller 18 rotates about its axis of rotation 24 in a counterclockwise rotation, as represented by arrow 26 in FIG. 1, and then travels downstream of the roller 18 where it may be further processed into specific rubber tire tread lengths (not shown) by way of example.

The roller die preformer 16 is the focus of the present invention and will be described herein in connection with the extrusion of a wide rubber tire tread on the outer surface 22 of the roller 18, although it will be appreciated that the present invention is applicable to a variety of extrusion applications as will be readily understood by those of ordinary skill in the art.

Referring now to FIGS. 1, 2, 2A and 3, the roller die preformer 16 comprises an elongated body, preferably manufactured of stainless steel, which is connected in a conventional manner to the extrusion head 12 and in fluid communication with the discharge outlet 14 of the extruder head 12. The roller die preformer 16 has an elongated flow inlet 28 (FIGS. 2A and 5) which is configured to receive a flow of material from the discharge outlet 14 of the extruder head 12 and is oriented generally normal to the outer surface 22 of the roller 15. In one embodiment, the flow inlet 28 of the roller die preformer 16 has a lateral width "$W_{inlet}$" (FIG. 12) which is generally equal to the lateral width of the elongated discharge outlet 14 of the extruder head 12.

As shown in FIGS. 2, 2A, 3, 8, 9 and 12, a laterally expanding flow channel 30 (FIGS. 2, 2A and 8) extends within the roller die preformer 16 between the flow inlet 28 and an elongated flow outlet 32 (FIGS. 3 and 9) of the preformer 16. The flow channel 30 is defined by a generally planar wall 34 (FIG. 2A) which extends from the flow inlet 28 toward the outer surface 22 of the roller 18, an opposite arcuate wall 36 (FIGS. 2A and 12) which is initially generally parallel to the planar wall 34 near the flow inlet 28 and then bends or diverges away from the planar wall 34 near the flow outlet 32, and a pair of arcuate side walls 38 (FIG. 9) which extend between the planar wall 34 and the opposite arcuate wall 36.

Figure 2:
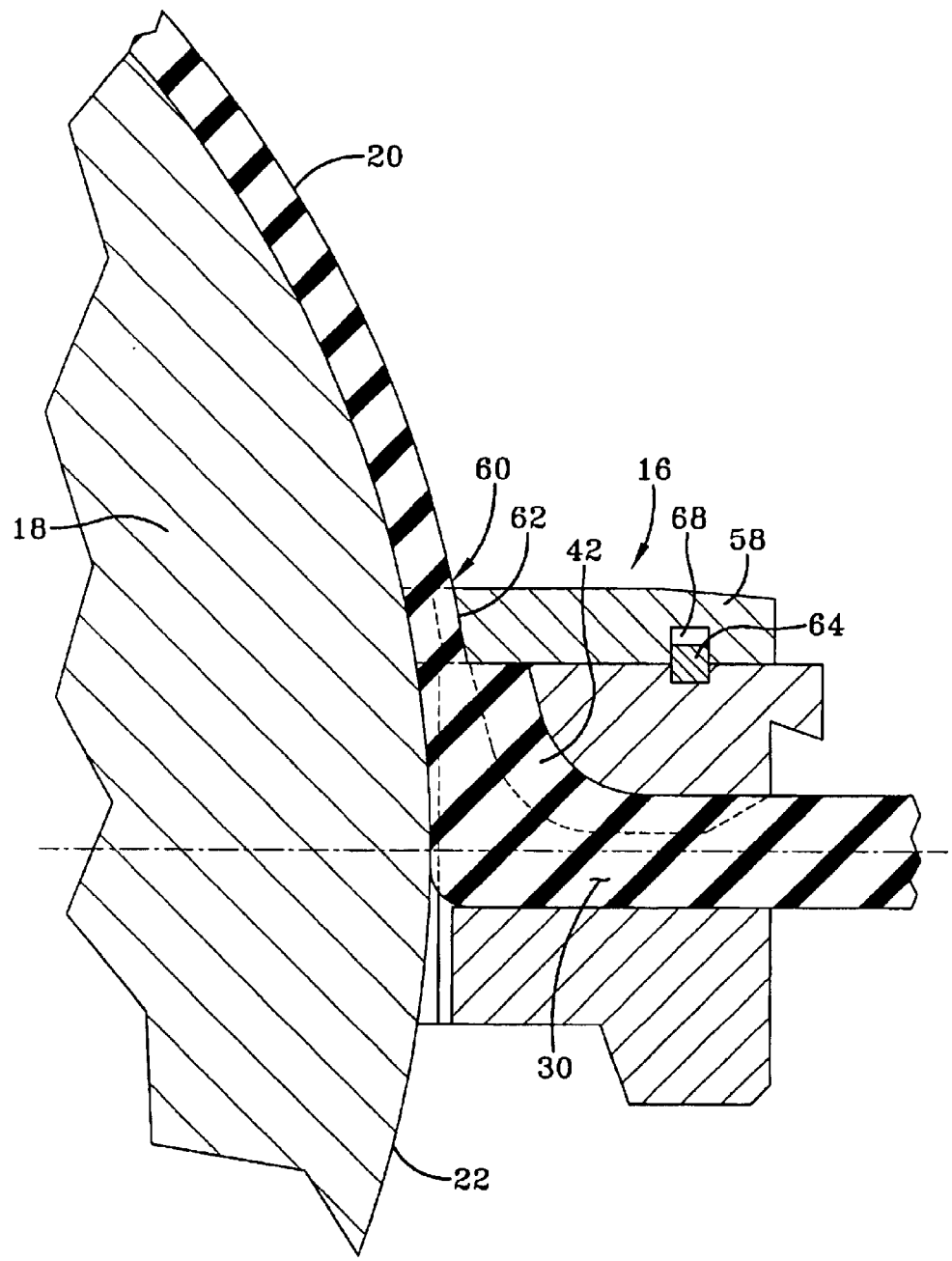
FIG. 2 is an enlarged partial view of the circled area shown in FIG. 1 illustrating the preformer in use.
Figure 3:
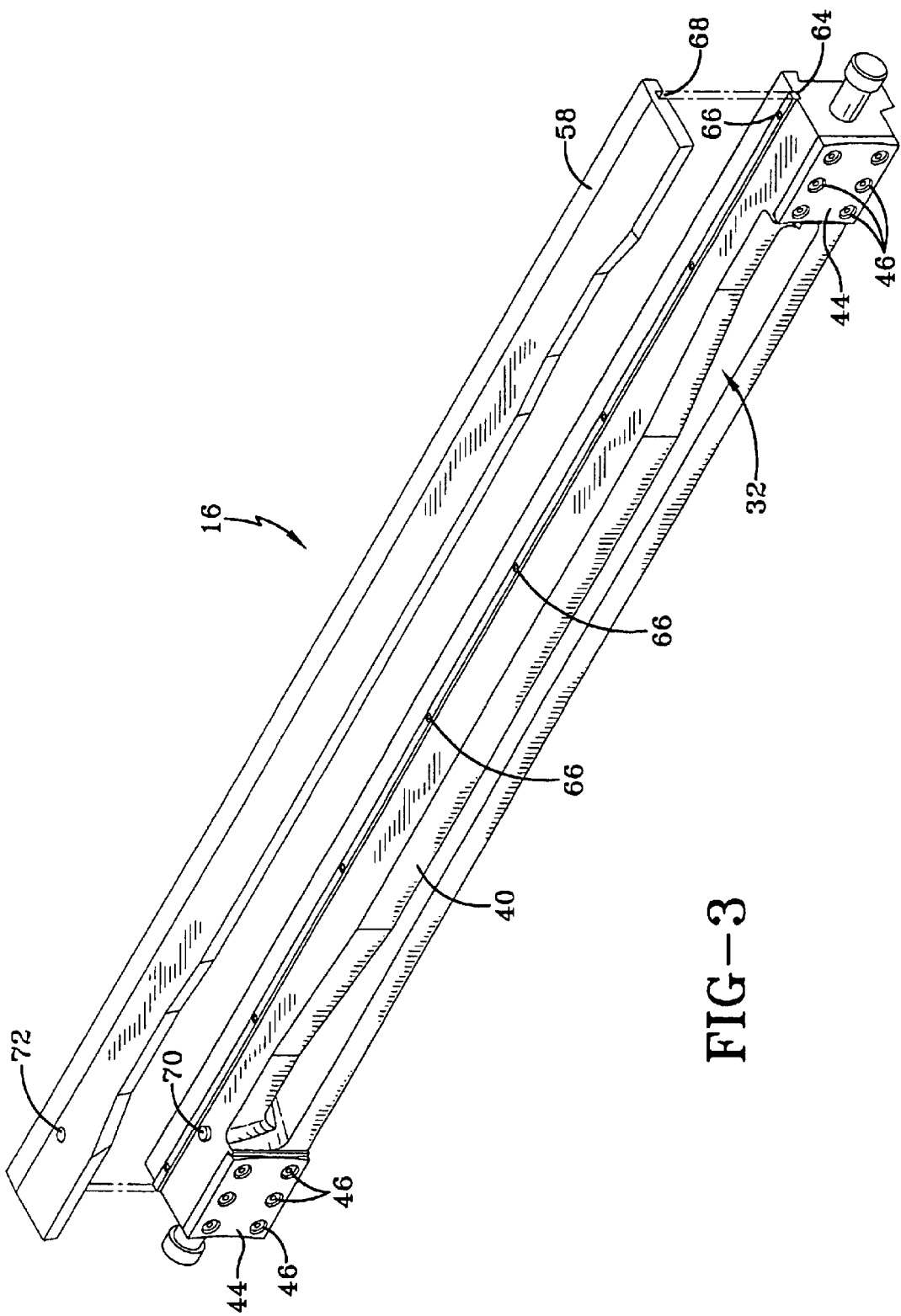
FIG. 3 is a perspective view of the preformer shown in FIG. 1 with a die plate disassembled from the preformer.
Figure 4:
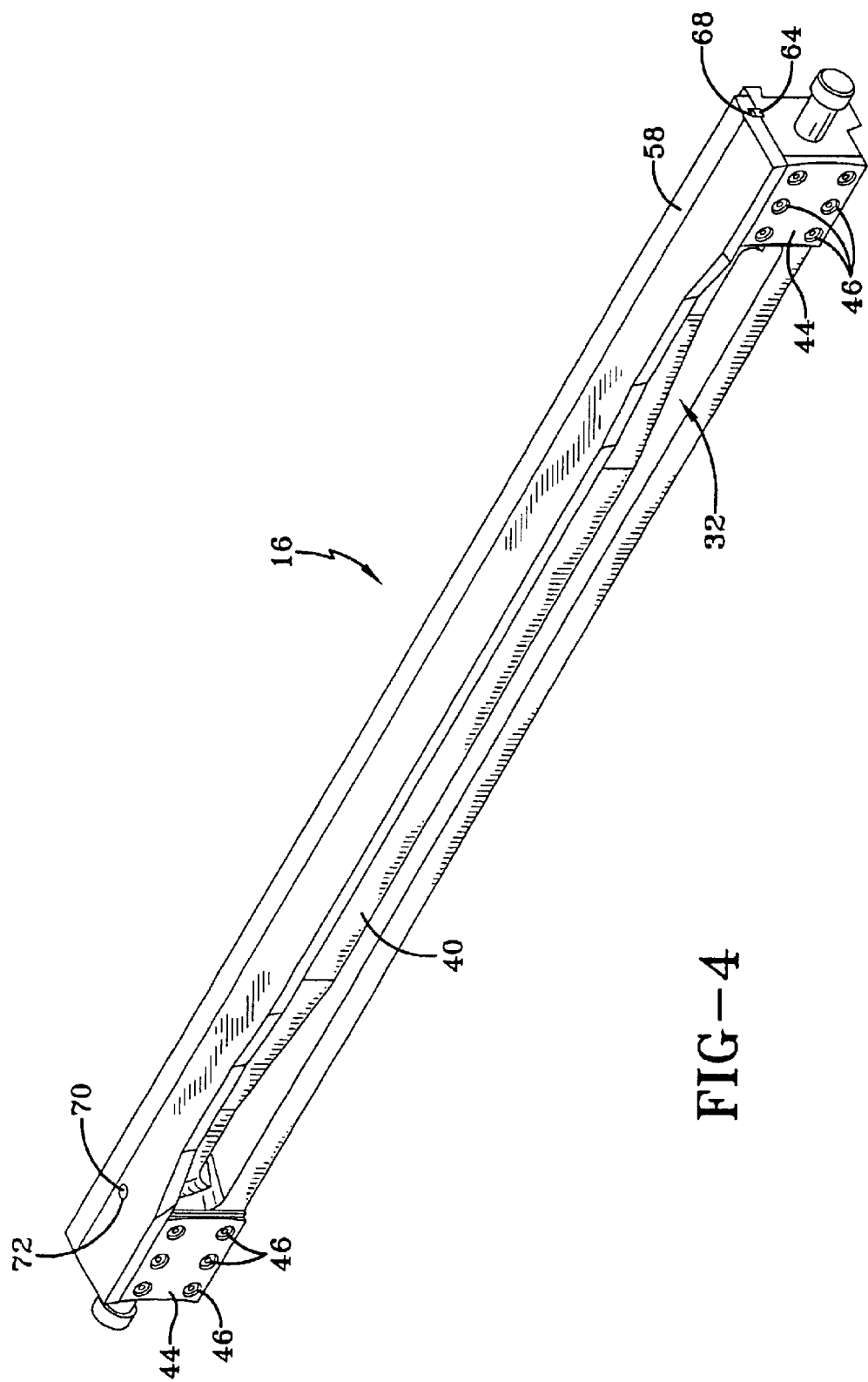
FIG. 4 is a view similar to FIG. 3 showing the preformer and die plate assembled.
Figure 8:
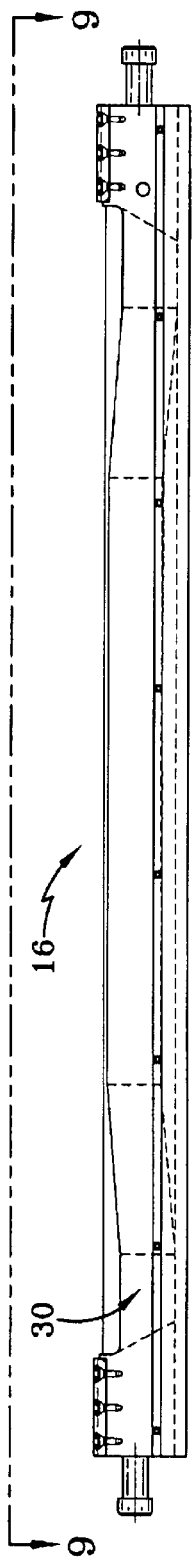
FIG. 8 is a side elevational view of the preformer taken along line 8—8 of FIG. 5.
Figure 9:
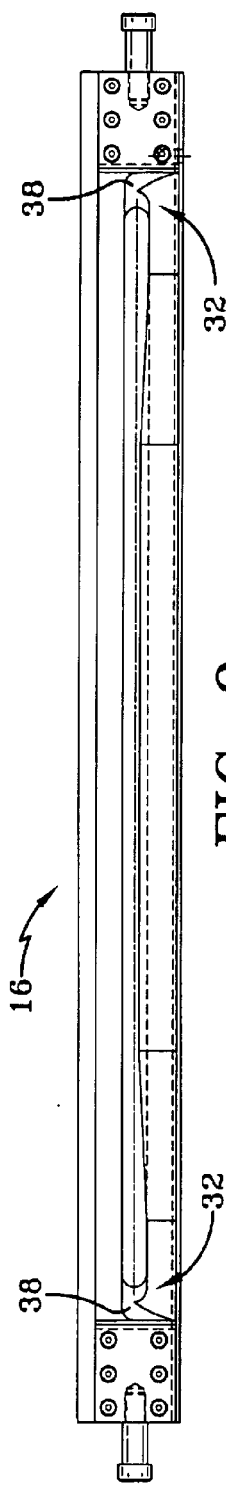
FIG. 9 is a side elevational view of the preformer shown in FIG. 1, illustrating the flow outlet side of the preformer.
Figure 10:
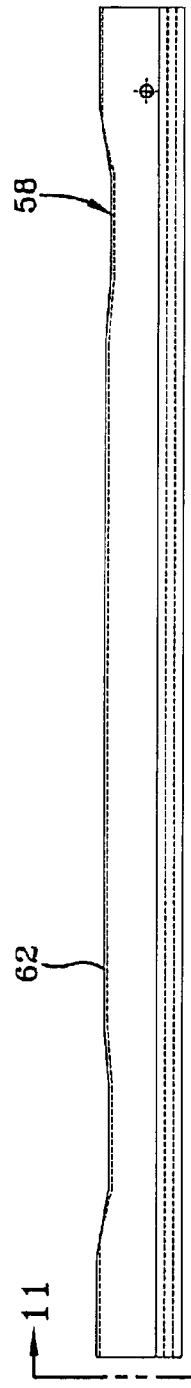
FIG. 10 is a top elevational view of the die plate shown in FIG. 1.
Figure 11:
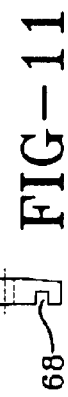
FIG. 11 is a side elevational view of the die plate taken along line 11—11 of FIG. 10.

Referring to FIGS. 2–4 and 9, the flow outlet 32 is defined by the outer surface 22 of the roller 18 (FIG. 2), an elongated face 40 (FIGS. 3 and 4) of the roller die preformer 16 which confronts the outer surface 22 of the roller 18, and the pair of arcuate side walls 38 (FIG. 9) of the flow channel 30. In this way, the flow outlet 32 is oriented generally tangential to the outer surface 22 of the roller 18. The flow channel 30 is configured to laterally expand a flow of material 42 (FIG. 2) as it travels from the flow inlet 28 to the flow outlet 32 to thereby form the wide extruded component 20 on the outer surface 22 of the roller 18 as it rotates about its axis of rotation 24. A pair of NYLATRON wear pads 44 (FIG. 3) are mounted through fasteners 46 to the roller die preformer 16 outboard of the flow outlet 32 as shown in FIG. 3. The wear pads 44 provide a low friction interface between the roller die preformer 16 and the roller 18 and also serve to wipe or clean the outer surface 22 of the roller 18 as it rotates relative to the fixed roller die preformer 16 during the extrusion process.

To overcome the attendant problem of elastic memory as the flow of material 42 is laterally expanded during its travel through the flow channel 30, the roller die preformer 16 includes a flow restrictor 48 (FIGS. 2A, 7 and 12) which is configured within the flow channel 30 to urge the flow of material 42 toward the lateral extremities of the flow channel 30. As shown in the Figures, the flow restrictor 48 is associated with the arcuate wall 36 (FIGS. 2A and 12) of the flow channel 30 and has a length, which extends substantially from the flow inlet 28 to the flow outlet 30. The flow restrictor 48 has a height within the flow channel 30 which increases along the substantial length of the flow restrictor 48 so as to narrow the height of the flow outlet 32 proximate a general central portion of the elongated face 40 of the preformer 16 which confronts the outer surface 22 of the roller 18.

Figure 2A:
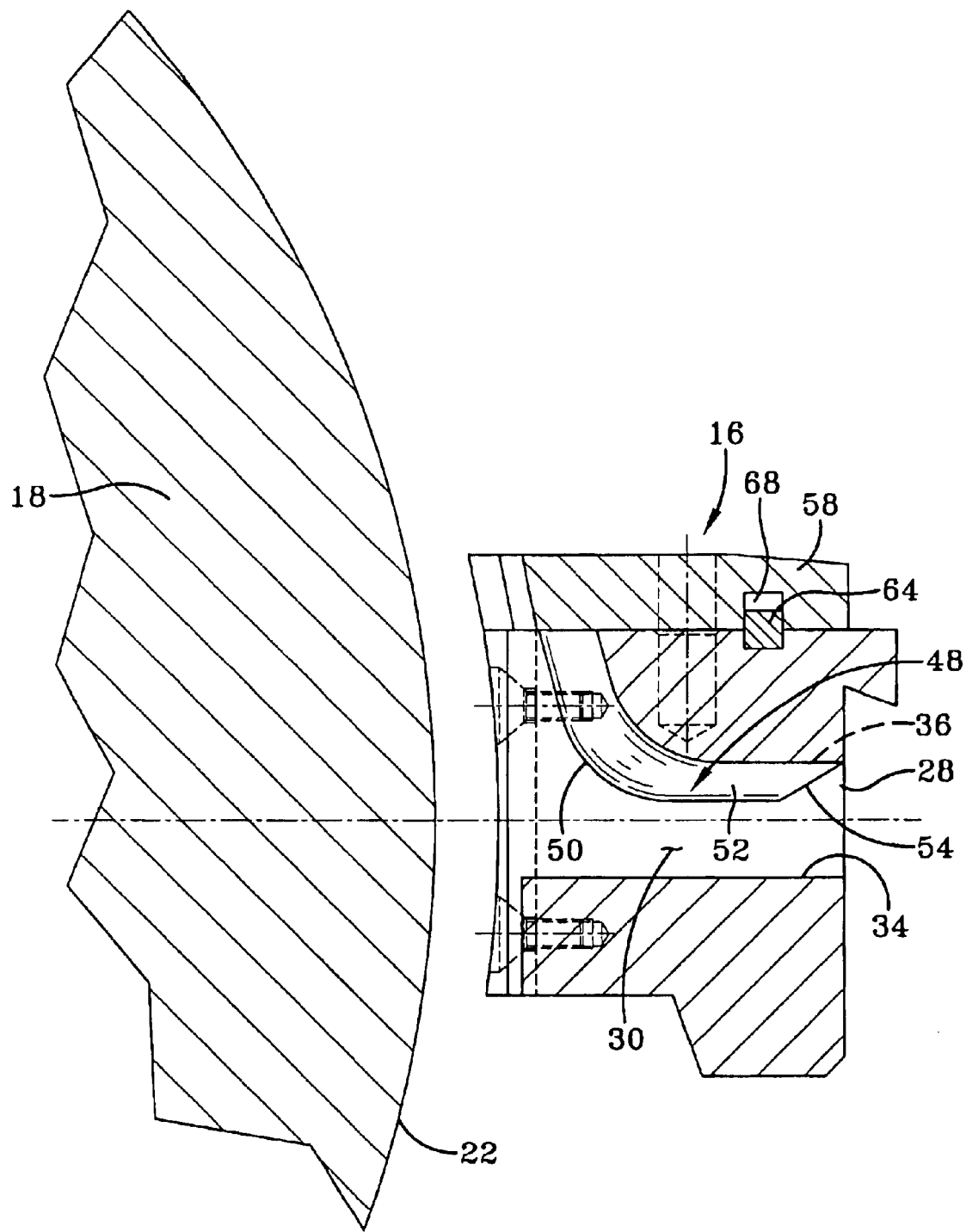
FIG. 2A is a view similar to FIG. 2 illustrating details of the preformer in accordance with one embodiment of the present invention.
Figure 12:
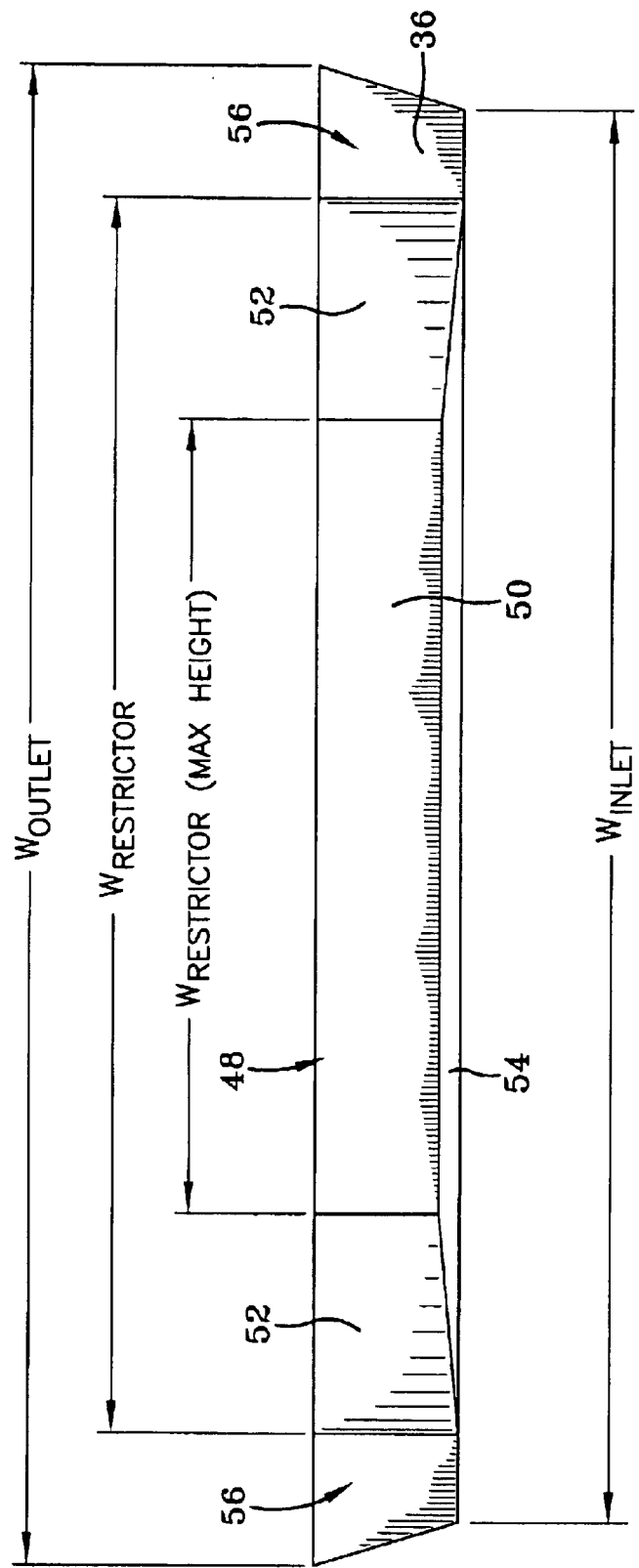
FIG. 12 is a flattened view of a laterally expanding flow channel within the preformer of FIG. 1.

In one embodiment, as shown in FIG. 2A and the flattened view of FIG. 12, the flow restrictor 48 has a lateral width "$W_{restrictor}$" which is generally constant along the length of the flow restrictor 48 within the flow channel 30. The flow restrictor 48 is formed by a major central face 50 having a lateral width "$W_{restrictor\ (max\ height)}$", a pair of chamfered side faces 52 which taper from respective opposite sides of the major face 50 to join with the arcuate wall 36 of the flow channel 30, and a chamfered lead face 54 which tapers from the major face 50 and the side faces 52 to join with the arcuate wall 36 of the flow channel 30 proximate the flow inlet 28. The flow restrictor 48 has maximum height within the flow channel 30 along the lateral width "$W_{restrictor\ (max\ height)}$" and length of the major face 50. In one embodiment, each of the faces 50, 52 and 54 is planar in cross-section, although it Is contemplated that the faces 50, 52 and 54 may be non-planar or rounded in cross-section in an alternative embodiment without departing from the spirit and scope of the present invention. Additionally, it is contemplated that a greater or lesser number of planar or non-planar faces may be used to form the flow restrictor 48 Within the flow channel 30 depending on a particular extrusion application.

During an extrusion process to form an extruded tire tread component 20 on the outer surface 22 of the roller 18, the flow of material 42 is introduced into the flow inlet 28 of the roller die preformer 16 from the discharge outlet 14 of the extruder head 12. The flow of material 42 impinges on the flow restrictor 48 at the lead face 54 so that lateral areas 56 of reduced pressure (FIG. 12) are thereby created on opposite sides of the flow restrictor 48 and toward the lateral extremities of the flow channel 30. These lateral areas 56 of reduced pressure allow a greater volume of the flow of material 42 to flow toward the lateral extremities of the flow channel 30 and toward the flow outlet 32 as compared to the volume of material flowing proximate the general central portion of the flow channel 30 so that a generally uniform flow distribution is achieved across the lateral width of the flow outlet 30. The height of the flow restrictor 48 is greatest within the flow channel 30 on the major face 50 proximate a general central portion of the flow outlet 32 so that the flow restrictor 48 narrows the height of the flow of material 42 to a greater extent proximate a general central portion thereof, while leaving the height of the flow of material 42 unrestricted at the lateral extremities of the flow outlet 32. In this way, the flow of material 42 is urged by the flow restrictor 48 to laterally expand within the flow channel, with a greater volume of the flow of material 42 being directed toward the lateral extremities of the flow channel 32 and toward the flow outlet 32. In accordance with the principles of the present invention, the flow of material 42 retains its expanded lateral width as it is extruded onto the outer surface 22 of the roller 18 because the elastic memory of the flow of material 42 has been altered by the lateral expansion of the flow of material 42 within the flow channel 32 as caused by the configuration of the flow restrictor 48.

In one embodiment, the flow inlet 28 has a lateral width "$W_{inlet}$" (FIG. 12) of about thirty-two (32) inches which corresponds to a thirty-two (32) inch lateral width of the discharge outlet 14 of the extruder head 12, and the flow outlet 32 of the preformer 16 has a lateral width "$W_{outlet}$" (FIG. 12) of about thirty-four (34) inches. Of course, other lateral width dimensions of the flow inlet 28 and the flow outlet 32 are possible as well depending on the particular extrusion application. In this embodiment, the major face 50 has a lateral width "$W_{restrictor\ (max\ height)}$" which is generally in the range of about 40% to about 60% of the lateral width "$W_{inlet}$" of the flow inlet 28, such as about 56% by way of example. The major face 50 has a height within the flow channel 30 proximate the flow inlet 28 which is in the range of about 30% to about 50% of the height of the flow inlet 28, such as about 33% by way of example. The chamfered lead face 54 blends the faces 50 and 52 of the flow restrictor 48 toward the flow inlet 28 so that the flow restrictor 48 has a lateral width "$W_{restrictor}$" which is in the range of about 80% to about 90% of the lateral width "$W_{inlet}$" of the flow inlet 28, such as about 88% by way of example.

As shown in FIGS. 2A and 12, the chamfered lead face 54 is disposed at an angle in the range of about 30' to about 450 relative to the arcuate wall 36 proximate the flow inlet 28 so as to restrict the flow of material 42 as it enters the roller die preformer 16 without unduly stagnating the flow at this area. The major face 50 of the flow restrictor 48 has a height within the flow channel 30 proximate the flow outlet 32 which is in the range of about 40% to about 80% of the height of the flow outlet 32, such as about 50% by way of example. It will be appreciated that this final height of the major face 50 may vary depending upon the amount of lateral movement of the flow of material that is required.

Referring now to FIGS. 2–4 and 10–11, an elongated die plate 58 is shown for use with the preformer 16 to profile the extrudate at it exits the flow outlet 32 and flows onto the outer surface 22 of the roller 18. As shown in FIG. 2, the die plate 58 is mounted to the preformer 16 so as to partially occlude the flow outlet 32 and thereby form a die outlet 60 which is defined between an elongated profiled face 62 of the die plate 58 and the outer surface 22 of the roller 18. An elongated key 64 is mounted through fasteners 66 to the preformer 16. The key 64 is received within an elongated key slot 68 formed in a surface of the die plate 58. A registration pin 70 (FIG. 3) is mounted within a bore 72 formed in the preformer 16 and the pin 70 is received within a registration aperture 74 formed in the die plate 58 to provide accurate registration of the die plate 58 relative to the preformer 16. The die plate 58 is secured to the preformer 16 through fasteners (not shown). In this way, die plates 58 having different configurations of profiled faces 62 are readily mounted to the roller die preformer 16 for a particular extrusion process.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

Having described the invention, what is claimed is:

1. A preformer for use in an extrusion system including a roller having an outer circumferential surface and an extruder head having a discharge outlet, said preformer comprising:

a flow inlet configured to receive a flow of material from the discharge outlet of the extruder head;

a flow outlet configured to form an extruded component on the outer circumferential surface of the roller from the flow of material received at said flow inlet;

a laterally expanding flow channel extending from said flow inlet to said flow outlet; and a flow restrictor disposed within said flow channel and having a length extending substantially from said flow inlet to said flow outlet and a lateral width which is generally constant along the length of said flow restrictor.

2. The preformer of claim 1 wherein said flow restrictor has a height within said flow channel which increases along the length of said flow restrictor from said flow inlet to said flow outlet.

3. The preformer of claim 1 further comprising a die plate configured to partially occlude said flow outlet to thereby profile the extruded component formed on the outer circumferential surface of the roller.

4. A preformer for use in an extrusion system including a roller having an outer circumferential surface and an extruder head having a discharge outlet, said preformer comprising:

a flow inlet configured to receive a flow of material from the discharge outlet of the extruder head;

a flow outlet configured to form an extruded component on the outer circumferential surface of the roller from the flow of material received at said flow inlet;

a laterally expanding flow channel defined by a pair of opposite side walls and extending from said flow inlet to said flow outlet; and a flow restrictor disposed within said flow channel and spaced from said pair of opposite side walls, said flow restrictor extending to said flow outlets and having a height within said flow channel which increases alone the substantial length of said flow restrictor so as to narrow a height of said flow outlet proximate a general central portion thereof.

5. The preformer of claim 4 wherein said flow restrictor has a length extending substantially from said flow inlet to said flow outlet.

6. The preformer of claim 4 wherein said flow restrictor has a height within said flow channel which increases along the length of said flow restrictor from said flow inlet to said flow outlet.

7. The preformer of claim 4 wherein said flow restrictor has a lateral width which is generally constant along the length of said flow restrictor.

8. The preformer of claim 4 further comprising a die plate configured to partially occlude said flow outlet to thereby profile the extruded component formed on the outer circumferential surface of the roller.

9. A preformer for use in an extrusion system including a roller having an outer circumferential surface and an extruder head having a discharge outlet, said preformer comprising:

a flow inlet configured to receive a flow of material from the discharge outlet of the extruder head;

a flow outlet configured to form an extruded component on the outer circumferential surface of the roller from the flow of material received at said flow inlet;

a laterally expanding flow channel defined by a pair of opposite side walls and extending from said flow inlet to said flow outlet; and a flow restrictor disposed within said flow channel and spaced from said pair of opposite side walls said flow restrictor having a height within said flow channel which increases along the substantial length of said flow restrictor from said flow inlet to said flow outlet.

10. The preformer of claim 9 wherein said flow restrictor has a lateral width which is generally constant along the length of said flow restrictor.

11. The preformer of claim 9 further comprising a die plate configured to partially occlude said flow outlet to thereby profile the extruded component formed on the outer circumferential surface of the roller.

12. An extrusion system, comprising:

a roller having an outer circumferential surface;

an extruder head having a discharge outlet;

a preformer operatively connected to said extruder head and disposed proximate said roller, said preformer having a flow inlet for receiving a flow of material from said discharge outlet of said extruder head, a flow outlet defined by said outer circumferential surface of said roller and an elongated face of said preformed, and a laterally expanding flow channel extending from said flow inlet to said flow outlet of said preformer to form an extruded component on said outer circumferential surface of said roller having a lateral width which is greater than the lateral width of said discharge outlet of said extruder head; and a flow restrictor disposed within said flow channel and having a length extending substantially from said flow inlet to said flow outlet of said preformer and a lateral width which is generally constant along the length of said flow restrictor.

13. The extrusion system of claim 12 wherein said flow restrictor has a height within said flow channel which increases along the length of said flow restrictor from proximate said flow Inlet to said flow outlet.

14. The extrusion system of claim 12 further comprising a die plate operatively connected to said preformer and configured to partially occlude said flow outlet of said preformer to thereby profile the extruded component formed on said outer circumferential surface of said roller.

15. An extrusion system, comprising:

a roller having an outer circumferential surface;

an extruder head having a discharge outlet;

a preformer operatively connected to said extruder head and disposed proximate said roller, said preformer having a flow inlet for receiving a flow of material from said discharge outlet of said extruder head, a flow outlet defined by said outer circumferential surface of said roller and an elongated face of said preformer, and a laterally expanding flow channel extending from said flow inlet to said flow outlet of said preformer to form an extruded component on said outer circumferential surface of said roller having a lateral width which is greater than the lateral width of said discharge outlet of said extruder head; and a flow restrictor disposed in said flow channel and extending to said flow outlet of said preformer, said flow restrictor having a height within said flow channel which increases along the substantial length of said flow restrictor so as to narrow a height of said flow outlet of said preformer proximate a general central portion thereof.

16. The extrusion system of claim 15 wherein said flow restrictor has a length extending substantially from said flow inlet to said flow outlet of said preformer.

17. The extrusion system of claim 15 wherein said flow restrictor has a height within said flow channel which increases along the length of said flow restrictor from proximate said flow inlet to said flow outlet.

18. The extrusion system of claim 15 wherein said flow restrictor has a lateral width which is generally constant along the length of said flow restrictor.

19. The extrusion system of claim 15 further comprising a die plate operatively connected to said preformer and configured to partially occlude said flow outlet of said preformer to thereby profile the extruded component formed on said outer circumferential surface of said roller.

20. An extrusion system, comprising:

a roller having an outer circumferential surface:

an extruder head having a discharge outlet;

a preformer operatively connected to said extruder head and disposed proximate said roller, said preformer having a flow inlet for receiving a flow of material from said discharge outlet of said extruder head, a flow outlet defined by said outer circumferential surface of said roller and an elongated face of said preformer, and a laterally expanding flow channel extending from said flow inlet to said flow outlet of said preformer to form an extruded component on said outer circumferential surface of said roller having a lateral width which is greater than the lateral width of said discharge outlet of said extruder head; and a flow restrictor disposed in said flow channel and having a height within said flow channel which increases along the substantial length of said flow restrictor from proximate said flow inlet to said flow outlet.

21. The extrusion system of claim 20 wherein said flow restrictor has a lateral width which is generally constant along the length of said flow restrictor.

22. The extrusion system of claim 20 further comprising a die plate operatively connected to said preformer and configured to partially occlude said flow outlet of said preformer to thereby profile the extruded component formed on said outer circumferential surface of said roller.

* * * * *

UNITED STATES PATENT AND TRADEMARK OFFICE
CERTIFICATE OF CORRECTION

PATENT NO. : 6,821,106 B1
DATED : November 23, 2004
INVENTOR(S) : Ernest Wilford Looman, Jr. et al.

It is certified that error appears in the above-identified patent and that said Letters Patent is hereby corrected as shown below:

Column 4,
Line 24, change "of the roller 15." to -- of the roller 18. --.

Column 5,
Line 25, change "although it Is contemplated that" to -- although it is contemplated that --.
Line 30, change "flow restrictor 48 Within the" to -- flow restrictor 48 within the --.

Column 6,
Line 17, change "range of about 30' to about 450 relative" to -- range of about 30º to about 45º relative --.

Column 7,
Lines 28-29, change "extending to said flow outlets and having a height within said flow channel which increases alone the substantial" to -- extending to said flow outlet and having a height within said flow channel which increases along the substantial --.
Line 60, change "from said pair of opposite side walls said flow restrictor having" to -- from said pair of opposite side walls, said flow restrictor having --.

Column 8,
Line 26, change "said flow Inlet to said flow outlet." to -- said flow inlet to said flow outlet. --.

Signed and Sealed this

Seventeenth Day of May, 2005

JON W. DUDAS
*Director of the United States Patent and Trademark Office*